United States Patent
Kishimoto et al.

(10) Patent No.: US 10,644,296 B2
(45) Date of Patent: *May 5, 2020

(54) ENERGY STORAGE DEVICE

(71) Applicant: GS Yuasa International Ltd., Kyoto-shi, Kyoto (JP)

(72) Inventors: Tomonori Kishimoto, Kyoto (JP); Noriyoshi Munenaga, Shiga (JP)

(73) Assignee: GS Yuasa International Ltd., Kyoto (JP)

(*) Notice: Subject to any disclaimer, the term of this patent is extended or adjusted under 35 U.S.C. 154(b) by 198 days.

This patent is subject to a terminal disclaimer.

(21) Appl. No.: 15/690,070

(22) Filed: Aug. 29, 2017

(65) Prior Publication Data

US 2017/0358790 A1 Dec. 14, 2017

Related U.S. Application Data

(63) Continuation of application No. 14/849,046, filed on Sep. 9, 2015, now Pat. No. 9,780,352.

(30) Foreign Application Priority Data

Sep. 11, 2014 (JP) ................................ 2014-185405
Jul. 27, 2015 (JP) ................................ 2015-148139

(51) Int. Cl.
*H01M 2/26* (2006.01)
*H01M 10/0525* (2010.01)

(52) U.S. Cl.
CPC ............ *H01M 2/263* (2013.01); *H01M 2/266* (2013.01); *H01M 10/0525* (2013.01)

(58) Field of Classification Search
CPC combination set(s) only.
See application file for complete search history.

(56) References Cited

U.S. PATENT DOCUMENTS

| 9,147,878 B2 | 9/2015 | Lee et al. |
| 9,653,714 B2 | 5/2017 | Mori et al. |
| 9,780,352 B2 * | 10/2017 | Kishimoto ............ H01M 2/263 |

(Continued)

FOREIGN PATENT DOCUMENTS

| JP | 2006236790 A2 | 9/2006 |
| JP | 2013077546 A2 | 4/2013 |

(Continued)

*Primary Examiner* — Kaity V Chandler
(74) *Attorney, Agent, or Firm* — Rankin, Hill & Clark LLP

(57) ABSTRACT

An energy storage device includes a positive electrode terminal, a first electrode body and a second electrode body, and a positive electrode current collector electrically connecting the positive electrode terminal and the first and second electrode bodies. The positive electrode current collector includes a terminal connection portion electrically connected to the positive electrode terminal, inner electrode body connection portions connected to the first and second electrode bodies, and a coupling portion extending from an end of the terminal connection portion and coupling the terminal connection portion and the inner electrode body connection portions. The coupling portion has a substantially trapezoidal shape with a width at a connection end with the end of the terminal connection portion being larger than a width at a connection end with the inner electrode body connection portions.

5 Claims, 12 Drawing Sheets

(56) References Cited

U.S. PATENT DOCUMENTS

| | | |
|---|---|---|
| 10,135,056 B2 * | 11/2018 | Kishimoto ............. H01G 11/06 |
| 2011/0052963 A1 | 3/2011 | Lee et al. |
| 2011/0076553 A1 | 3/2011 | Kameda et al. |
| 2011/0195286 A1 | 8/2011 | Aota et al. |
| 2011/0223454 A1 | 9/2011 | Urano et al. |
| 2012/0135283 A1 | 5/2012 | Lee |
| 2013/0017420 A1 | 1/2013 | Byun et al. |
| 2013/0029188 A1 | 1/2013 | Kim et al. |
| 2013/0078492 A1 * | 3/2013 | Sasaki .................... H01M 2/22 |
| | | 429/94 |
| 2013/0084471 A1 | 4/2013 | Han |
| 2013/0130079 A1 | 5/2013 | Kako et al. |
| 2013/0130104 A1 | 5/2013 | Tsuruta |
| 2013/0143111 A1 | 6/2013 | Tsutsumi |
| 2013/0196218 A1 | 8/2013 | Masuda |
| 2013/0196229 A1 | 8/2013 | Shiraishi et al. |
| 2014/0302380 A1 | 10/2014 | Song |
| 2014/0315052 A1 * | 10/2014 | Byun ..................... H01M 2/34 |
| | | 429/61 |
| 2015/0044526 A1 | 2/2015 | Guen et al. |
| 2015/0072186 A1 | 3/2015 | Guen |

FOREIGN PATENT DOCUMENTS

| | | |
|---|---|---|
| JP | 2013127948 A2 | 6/2013 |
| JP | 2013161758 A2 | 8/2013 |
| JP | 2015-135772 | 7/2015 |
| WO | 2012023434 A1 | 2/2012 |

* cited by examiner

FIG. 1
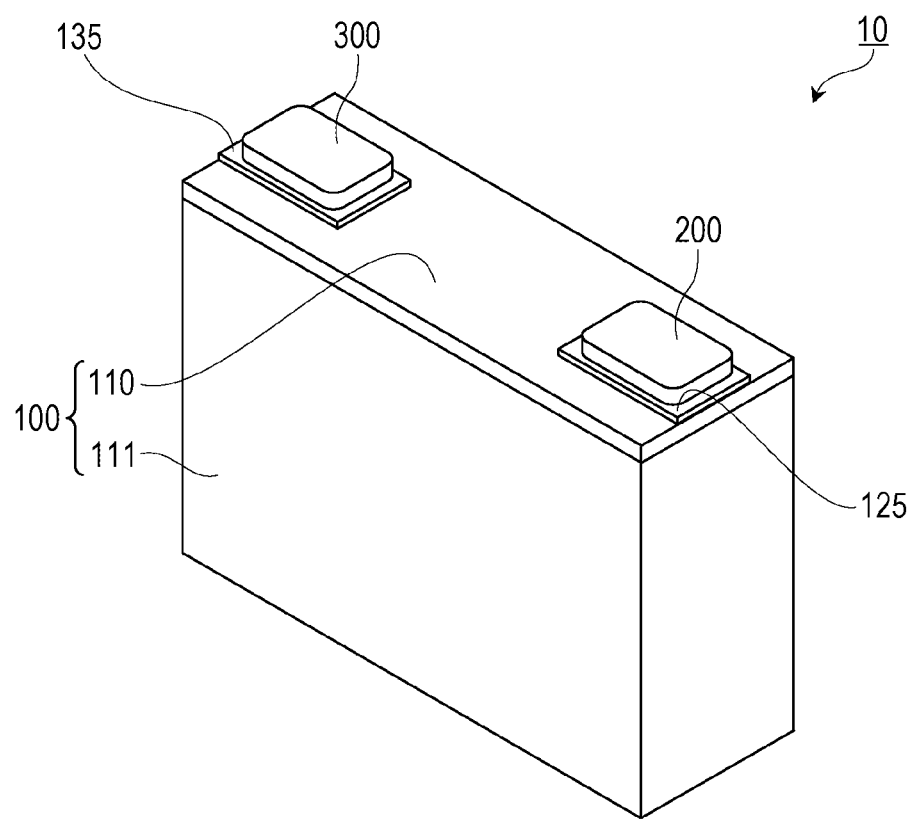
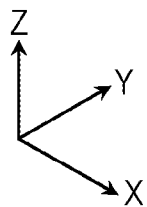

ENERGY STORAGE DEVICE

CROSS-REFERENCE TO RELATED APPLICATIONS

This application claims the benefit of Japanese patent applications No. 2014-185405, filed on Sep. 11, 2014, and No. 2015-148139, filed on Jul. 27, 2015, which are incorporated by reference.

FIELD

The present invention relates to an energy storage device including an electrode terminal, an electrode body, and a current collector electrically connecting the electrode terminal and the electrode body.

BACKGROUND

The changeover from gasoline vehicles to electric vehicles has been more important as an approach to global environmental issues. Accordingly, electric vehicles (EV), plug-in hybrid electric vehicles (PHEV), and hybrid electric vehicles (HEV) have been developing, each of which includes a power source embodied by an energy storage device such as a lithium ion secondary battery. Such an energy storage device typically includes an electrode body having positive and negative electrodes, an electrode terminal, and a current collector electrically connecting the electrode body and the electrode terminal.

There has been conventionally proposed an energy storage device including electrode bodies that are joined and retained to a current collector so as to be hung from the current collector (see JP-A-2013-077546, for example). In this energy storage device, a plurality of legs extending downward from the single current collector is joined to the plurality of electrode bodies, respectively, such that the electrode bodies are hung from the current collector and retained.

A current collector included in an energy storage device, like the one disclosed in JP-A-2013-077546, is typically manufactured by processing, such as bending, a metal plate member having a predetermined shape.

Specifically, the current collector is a member obtained through metalworking. It is thus necessary to prevent a crack, a fissure, and the like of the plate member during processing, such as bending, the plate member. For example, a bending line is provided at an end with a cut-away portion called an escape, for relief of stress concentration that causes a crack and the like.

Such provision of a cut-away portion at a bent position can cause a phenomenon deteriorating reliability of the current collector such as increase in electric resistance and deterioration in strength if the bent position has a portion of a smaller sectional area than those at adjacent positions.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage device including a current collector of high reliability.

An energy storage device according to an aspect of the present invention includes an electrode terminal, at least one electrode body, and a current collector electrically connecting the electrode terminal and the at least one electrode body, wherein the current collector includes a terminal connection portion electrically connected to the electrode terminal, two electrode body connection portions connected to the at least one electrode body, and a coupling portion extending from an end of the terminal connection portion and coupling the terminal connection portion and the two electrode body connection portions, and the coupling portion has a substantially trapezoidal shape with a width at a connection end with the end of the terminal connection portion being larger than a width at a connection end with the two electrode body connection portions.

BRIEF DESCRIPTION OF DRAWINGS

The foregoing and other features of the present invention will become apparent from the following description and drawings of an illustrative embodiment of the invention in which:

FIG. 1 is a schematic perspective view of outer appearance of an energy storage device according to an embodiment.

DESCRIPTION OF EMBODIMENTS

Figure 2:
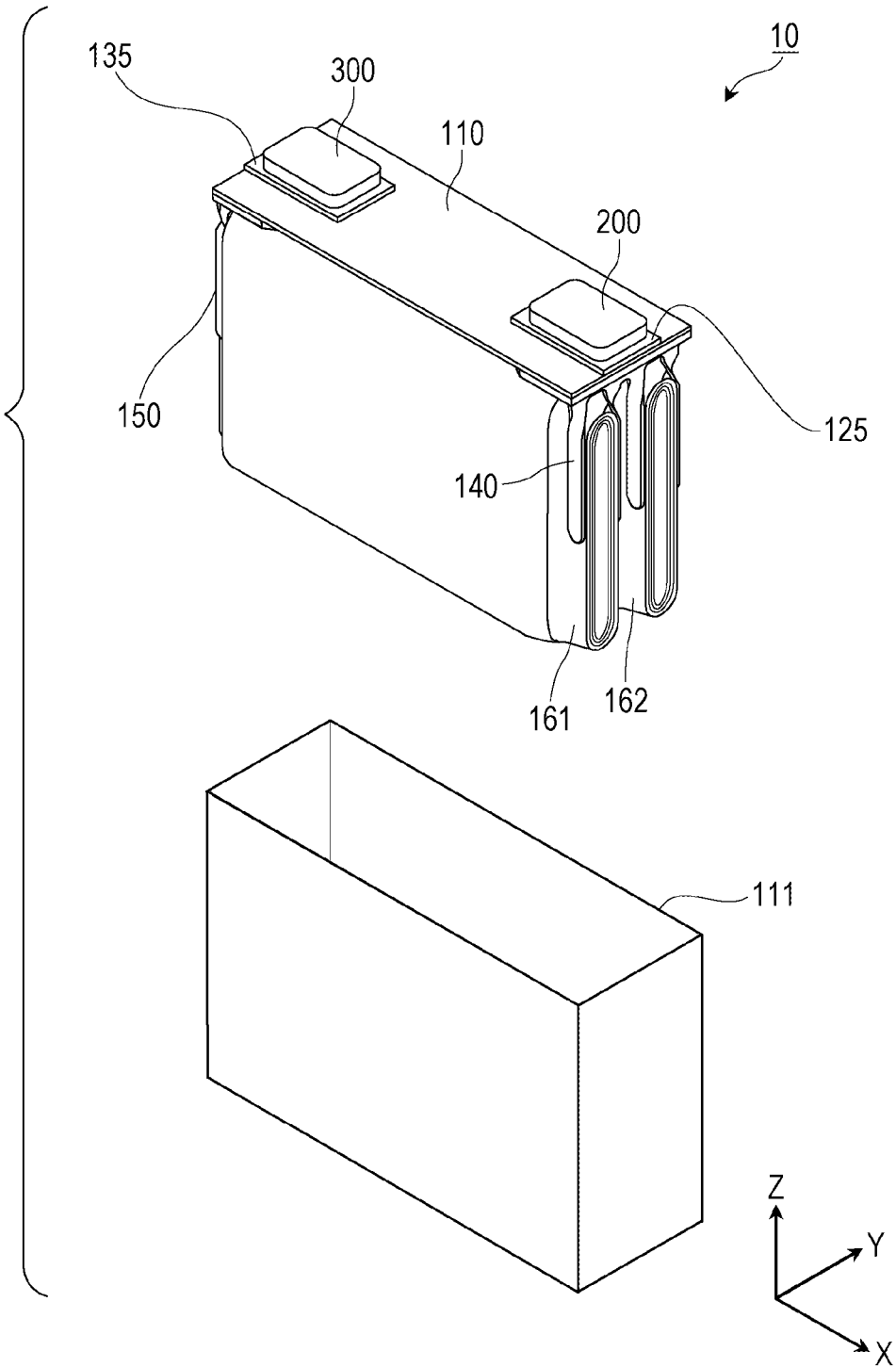
FIG. 2 is a perspective view of constituent elements included in the energy storage device, which is separated from a case body of a case.

According to an aspect of the present invention, there is provided an energy storage device including an electrode terminal, at least one electrode body, and a current collector electrically connecting the electrode terminal and the at least one electrode body, wherein the current collector includes a terminal connection portion electrically connected to the electrode terminal, two electrode body connection portions connected to the at least one electrode body, and a coupling portion extending from an end of the terminal connection portion and coupling the terminal connection portion and the two electrode body connection portions, and the coupling portion has a substantially trapezoidal shape with a width at a connection end with the end of the terminal connection portion being larger than a width at a connection end with the two electrode body connection portions.

In this configuration, the coupling portion extending from the terminal connection portion couples the terminal connection portion and the two electrode body connection portions in the current collector. The coupling portion has a substantially trapezoidal shape in a side view (when the current collector is seen from a position opposite the electrode body) with the upper base connected to the end of the terminal connection portion being longer than the lower base connected to the two electrode body connection portions.

Specifically, the coupling portion is gradually reduced in width from the connection end with the terminal connection portion toward the two electrode body connection portions. Accordingly, the two electrode body connection portions each have a natural posture suited to connection with the electrode body.

The coupling portion in the current collector is formed in a substantially trapezoidal shape with the width close to the terminal connection portion being larger than the width close to the two electrode body connection portions. The manufactured current collector can thus prevent occurrence of a crack and the like due to bending without provision of any cut-away portion at the coupling portion.

The coupling portion accordingly has no portion of a smaller sectional area due to provision of the cut-away portion. This configuration does not cause problems such as increase in electric resistance and deterioration in strength between the terminal connection portion and the two electrode body connection portions.

The energy storage device according to this aspect thus includes the current collector of high reliability.

In the energy storage device according to an aspect of the present invention, the coupling portion can have an area of a cross section along a width and perpendicular to an outer side surface, being not less than total areas of cross sections along a width of the two electrode body connection portions at any position in an extending direction of the coupling portion.

In this configuration, the coupling portion does not have any portion of a smaller sectional area than the total sectional areas of the two electrode body connection portions. This configuration further improves reliability of the current collector in a case where a large amount of current flows between the terminal connection portion and the two electrode body connection portions.

In the energy storage device according to an aspect of the present invention, the coupling portion can extend from part of a side at the end of the terminal connection portion.

In this configuration, the coupling portion can be provided such that the terminal connection portion has a relatively long width and the two electrode body connection portions are disposed at positions in the width direction suited to connection with at least one electrode body. The current collector according to this aspect can reduce electric resistance at the terminal connection portion and includes the coupling portion and the two electrode body connection portions at positions suited to connection with the electrode body.

In the energy storage device according to an aspect of the present invention, the side at the end of the terminal connection portion can be provided with a cut-off portion at a position beside the connection end with the coupling portion.

This configuration facilitates the step of bending the coupling portion at the connection end with the terminal connection portion during manufacture of the current collector and reduces possibility of damage such as a crack. Furthermore, these effects can be achieved without causing problems such as increase in electric resistance and deterioration in strength.

In the energy storage device according to an aspect of the present invention, the coupling portion and each of the two electrode body connection portions can be connected by way of a curved portion.

In the energy storage device according to an aspect of the present invention, a first one of the two electrode body connection portions can be connected to a first one of the two electrode bodies, and a second one of the two electrode body connection portions can be connected to a second one of the two electrode bodies.

In the energy storage device according to an aspect of the present invention, the coupling portion can be positioned between the two electrode bodies in an alignment direction of the two electrode bodies.

In the energy storage device according to an aspect of the present invention, the two electrode body connection portions can extend from the coupling portion oppositely with respect to the terminal connection portion.

In the energy storage device according to an aspect of the present invention, the current collector can further have another electrode body connection portion extending from the terminal connection portion and aligned with the two electrode body connection portions.

In the energy storage device according to an aspect of the present invention, the coupling portion can have a bead portion.

The present invention can be embodied as an energy storage device including the current collector according to any one of the aspects described above, as well as can be embodied as the current collector.

The present invention provides an energy storage device including a current collector of high reliability.

An energy storage device according to each embodiment of the present invention will now be described below with reference to the drawings. The embodiments to be described below each refer to a comprehensive or specific example. The following embodiments exemplify numerical values, shapes, materials, constituent elements, locations and connection states of the constituent elements, and the like, which are not intended to limit the present invention. Among the constituent elements according to the following embodiments, those not recited in independent claims on the superordinate concept are to be described as optional constituent elements.

An up-down direction of an energy storage device is defined as a Z axis direction (hereinafter, also referred to as a first direction) in the following description and drawings. In other words, the Z axis direction can be defined as an extending direction of legs (electrode body connection portions) of a current collector or a longitudinal direction of short side surfaces of a case.

Furthermore, an alignment direction of two electrode bodies is defined as a Y axis direction (hereinafter, also referred to as a second direction or a width direction). In other words, the Y axis direction can be defined as an opposing direction of long side surfaces of the case, a transverse direction of the short side surfaces of the case, or a thickness direction of the case.

Furthermore, a direction crossing the Z axis direction and the Y axis direction is defined as an X axis direction (hereinafter, also referred to as a third direction). In other words, the X axis direction can be defined as a winding axis direction of the electrode body in the energy storage device, the alignment direction of current collectors or electrode terminals, or an opposing direction of the short side surfaces of the case.

The Z axis direction is assumed as the up-down direction, which may be or may not be parallel to the vertical direction. In other words, the energy storage device is not particularly limited in terms of its posture in use.

Embodiment

An energy storage device 10 according to an embodiment will be described initially.

FIG. 1 is a schematic perspective view of outer appearance of the energy storage device 10 according to the embodiment. FIG. 2 is a perspective view of constituent elements included in the energy storage device 10 according to the embodiment, which is separated from a case body 111 of a case 100.

Figure 3:
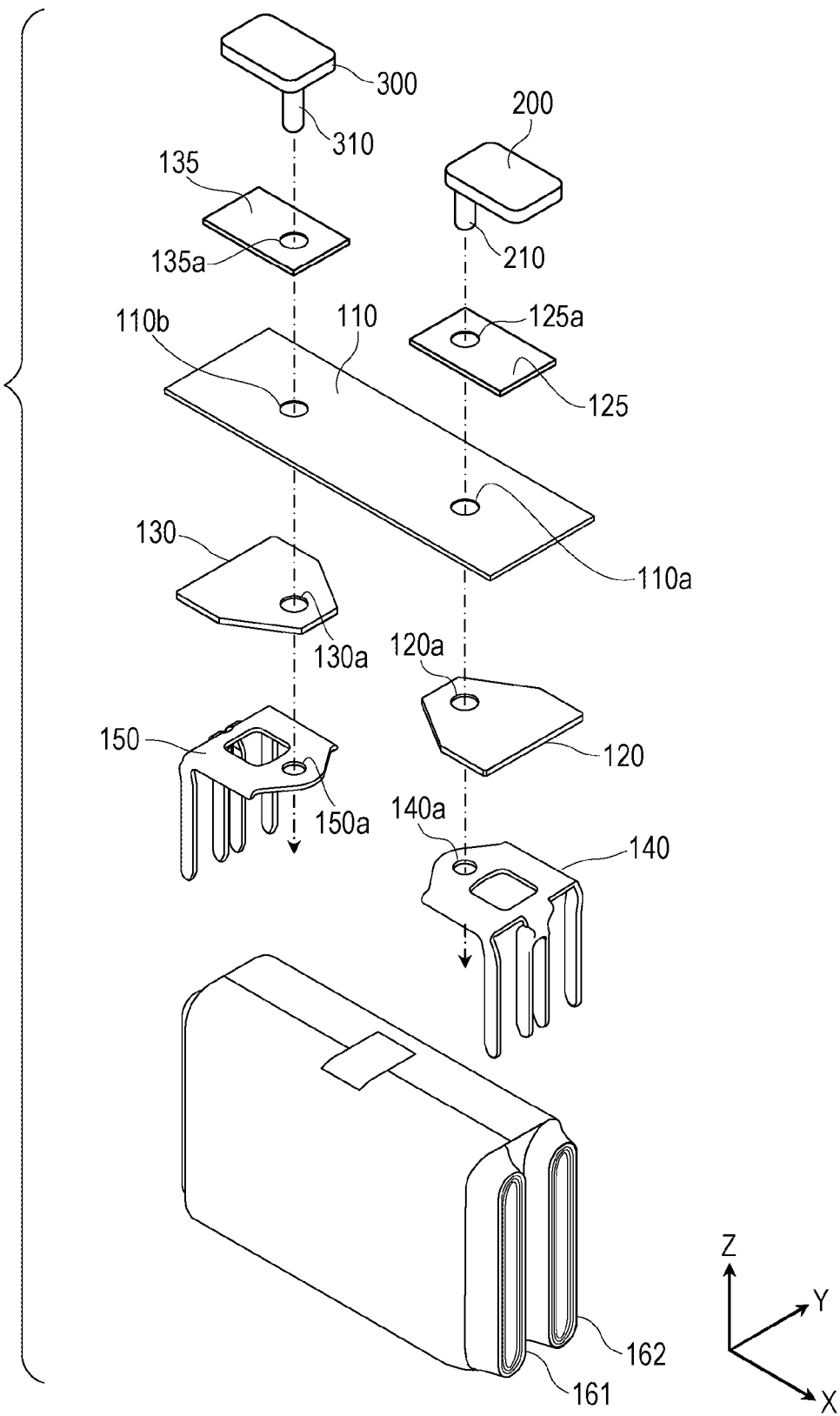
FIG. 3 is an exploded perspective view of the energy storage device.

FIG. 3 is an exploded perspective view of the energy storage device 10 according to the embodiment. FIG. 3 does not show the case body 111 of the case 100.

The energy storage device 10 includes an electrode terminal, an electrode body, and a current collector electrically connecting the electrode terminal and the electrode body.

Specifically, the energy storage device 10 is a secondary battery configured to charge and discharge electricity. More specifically, the energy storage device 10 is a nonaqueous electrolyte secondary battery such as a lithium ion secondary battery. The energy storage device 10 is applied particularly to an electric vehicle (EV), a plug-in hybrid electric vehicle (PHEV), or a hybrid electric vehicle (HEV). The energy storage device 10 is not limited to a nonaqueous electrolyte secondary battery, but can be a secondary battery other than the nonaqueous electrolyte secondary battery or can be a capacitor.

As shown in FIGS. 1 to 3, the energy storage device 10 includes the case 100, a positive electrode terminal 200, and a negative electrode terminal 300. The case 100 is provided outside thereof with upper insulating members 125 and 135. The case 100 accommodates lower insulating members 120 and 130, a positive electrode current collector 140, a negative electrode current collector 150, and two electrode bodies, namely, first and second electrode bodies 161 and 162.

The case 100 of the energy storage device 10 is filled with liquid such as an electrolyte solution (nonaqueous electrolyte solution). This liquid is not shown in the drawings. The electrolyte solution filled in the case 100 is not particularly limited in terms of its type but can be of any type, unless the electrolyte solution affects performance of the energy storage device 10.

The case 100 includes the case body 111 having a rectangular pipe shape and provided with a bottom, and a lid 110 as a plate member closing an opening in the case body 111. The lid 110 and the case body 111 are welded, for example, to each other after the first and second electrode bodies 161 and 162 and the like are accommodated in the case 100. The case 100 is thus structured to seal its internal space. The lid 110 and the case body 111 are not particularly limited in terms of their materials, but are preferably made of weldable metal such as stainless steel, aluminum, aluminum alloy, or the like.

The first and second electrode bodies 161 and 162 are two power generating elements aligned parallelly and both of them are electrically connected to the positive electrode current collector 140 and the negative electrode current collector 150. The first and second electrode bodies 161 and 162 are configured identically with each other.

Specifically, the first and second electrode bodies 161 and 162 are members each including a positive electrode, a negative electrode, and a separator and configured to store electricity. The positive electrode includes a positive electrode substrate layer of metal foil having a long belt shape and made of aluminum, aluminum alloy, or the like, and a positive active material layer provided on the positive electrode substrate layer. The negative electrode includes a negative electrode substrate layer of metal foil having a long belt shape and made of copper, copper alloy, or the like, and a negative active material layer provided on the negative electrode substrate layer. The separator is a micro porous sheet made of resin.

A positive active material in the positive active material layer or a negative active material in the negative active material layer can be any appropriate known material if the positive active material or the negative active material can occlude and emit lithium ions.

In the first and second electrode bodies 161 and 162, the positive and negative electrodes and the separator interposed therebetween are layered and wound together. FIGS. 2 and 3 show the first and second electrode bodies 161 and 162 each having a long circular shape. Each of the electrode bodies 161 and 162 can alternatively have a circular shape or an elliptical shape. Each of the first and second electrode bodies 161 and 162 is not limited to the wound shape but can be formed by layering flat plate electrode layers.

Each of the first and second electrode bodies 161 and 162 includes a positive electrode end connected to the positive electrode current collector 140 and a negative electrode end connected to the negative electrode current collector 150.

The positive electrode end is an end close to the positive electrode of the electrode body formed by layering and collecting an active material layer unformed portion of the positive electrode. The negative electrode end is an end close to the negative electrode of the electrode body formed by layering and collecting an active material layer unformed portion of the negative electrode.

At the active material layer unformed portion of the positive electrode, the positive active material is not applied to the positive electrode and the positive electrode substrate layer is exposed. At the active material layer unformed portion of the negative electrode, the negative active material is not applied to the negative electrode and the negative electrode substrate layer is exposed.

The first and second electrode bodies 161 and 162 according to the present embodiment are bound by an insulating film.

The energy storage device 10, which includes the plurality of electrode bodies (two electrode bodies according to the present embodiment) as described above, is preferred in terms of the following points in comparison to a case where the case 100 of the same volume (capacity) accommodates a single electrode body.

In comparison to the case of providing a single electrode body, provision of the plurality of electrode bodies reduces vacant corner spaces in the case 100 to improve occupancy of the electrode bodies. This leads to increase in energy storage capacity of the energy storage device 10.

In comparison to a high-capacity electrode body, a high input/output (high-rate) electrode body particularly needs to reduce the amount of the active material on the metal foil and the metal foil and the separator thus have higher occupancy in the electrode body. Provision of a single electrode body thus increases the number of times of winding the electrodes. Such a single electrode body is solid with low flexibility and is difficult to be inserted to the case 100. In contrast, provision of the plurality of electrode bodies reduces the number of winding times in each of the electrode bodies thereby to achieve the electrode bodies of high flexibility.

The positive electrode current collector 140 is disposed close to the positive electrodes of the first and second electrode bodies 161 and 162, is electrically connected to the positive electrode terminal 200 and the positive electrodes of the first and second electrode bodies 161 and 162, and has conductivity and rigidity. The positive electrode current collector 140 is made of aluminum, aluminum alloy, or the like, similarly to the positive electrode substrate layers of the first and second electrode bodies 161 and 162.

Specifically, the positive electrode current collector 140 is joined by welding or the like to the positive electrode ends of the first and second electrode bodies 161 and 162, so as to be connected to the positive electrodes of the first and second electrode bodies 161 and 162. The positive electrode current collector 140 is further provided with an opening 140a to which a connection portion 210 of the positive electrode terminal 200 to be described later is inserted and caulked, so that the positive electrode current collector 140 and the positive electrode terminal 200 are connected to each other.

The negative electrode current collector 150 is disposed close to the negative electrodes of the first and second electrode bodies 161 and 162, is electrically connected to the negative electrode terminal 300 and the negative electrodes of the first and second electrode bodies 161 and 162, and has conductivity and rigidity. The negative electrode current collector 150 is made of copper, copper alloy, or the like, similarly to the negative electrode substrate layers of the first and second electrode bodies 161 and 162.

Specifically, the negative electrode current collector 150 is joined by welding or the like to the negative electrode ends of the first and second electrode bodies 161 and 162, so as to be connected to the negative electrodes of the first and second electrode bodies 161 and 162. The negative electrode current collector 150 is further provided with an opening 150a to which a connection portion 310 of the negative electrode terminal 300 to be described later is inserted and caulked, so that the negative electrode current collector 150 and the negative electrode terminal 300 are connected to each other.

The lower insulating member 120 and the upper insulating member 125 are gaskets that are made of insulating resin or the like and are fixed to the lid 110 of the case 100 to insulate the positive electrode current collector 140 from the case 100. The lower insulating member 120 is provided with an opening 120a to which the connection portion 210 of the positive electrode terminal 200 to be described later is inserted. The upper insulating member 125 is provided with an opening 125a to which the connection portion 210 is inserted.

The lower insulating member 130 and the upper insulating member 135 are gaskets that are made of insulating resin or the like and are fixed to the lid 110 of the case 100 to insulate the negative electrode current collector 150 from the case 100. The lower insulating member 130 is provided with an opening 130a to which the connection portion 310 of the negative electrode terminal 300 to be described later is inserted. The upper insulating member 135 is provided with an opening 135a to which the connection portion 310 is inserted.

The positive electrode terminal 200 is electrically connected to the positive electrodes of the first and second electrode bodies 161 and 162. The negative electrode terminal 300 is electrically connected to the negative electrodes of the first and second electrode bodies 161 and 162. The positive electrode terminal 200 and the negative electrode terminal 300 are attached to the lid 110 that is disposed above the first and second electrode bodies 161 and 162.

As shown in FIG. 3, the positive electrode terminal 200 is provided with the connection portion 210 electrically connecting the positive electrode terminal 200 and the positive electrode current collector 140.

The connection portion 210 is a member exemplified by a rivet or the like, which is inserted to the opening 140a in the positive electrode current collector 140 so as to be connected to the positive electrode current collector 140. Specifically, the connection portion 210 is inserted to the opening 125a in the upper insulating member 125, a through hole 110a provided in the lid 110, the opening 120a in the lower insulating member 120, and the opening 140a in the positive electrode current collector 140, and is then caulked. The positive electrode terminal 200 is thus fixed to the lid 110 together with the upper insulating member 125, the lower insulating member 120, and the positive electrode current collector 140.

Similarly, the negative electrode terminal 300 is provided with the connection portion 310 electrically connecting the negative electrode terminal 300 and the negative electrode current collector 150. The connection portion 310 is a member exemplified by a rivet or the like, which is inserted to the opening 150a in the negative electrode current collector 150 so as to be connected to the negative electrode current collector 150. Specifically, the connection portion 310 is inserted to the opening 135a in the upper insulating member 135, a through hole 110b provided in the lid 110, the opening 130a in the lower insulating member 130, and the opening 150a in the negative electrode current collector 150, and is then caulked. The negative electrode terminal 300 is thus fixed to the lid 110 together with the upper insulating member 135, the lower insulating member 130, and the negative electrode current collector 150.

The configurations of the positive electrode current collector 140 and the negative electrode current collector 150, as the characteristics of the energy storage device 10 according to the present embodiment, will now be described in detail. The positive electrode current collector 140 and the negative electrode current collector 150 are configured similarly. Accordingly, the positive electrode current collector 140 will be described below whereas the negative electrode current collector 150 will not be described herein. That is, the structural characteristics of the positive electrode current collector 140 to be described below are to be applied also to the negative electrode current collector 150.

Figure 4:
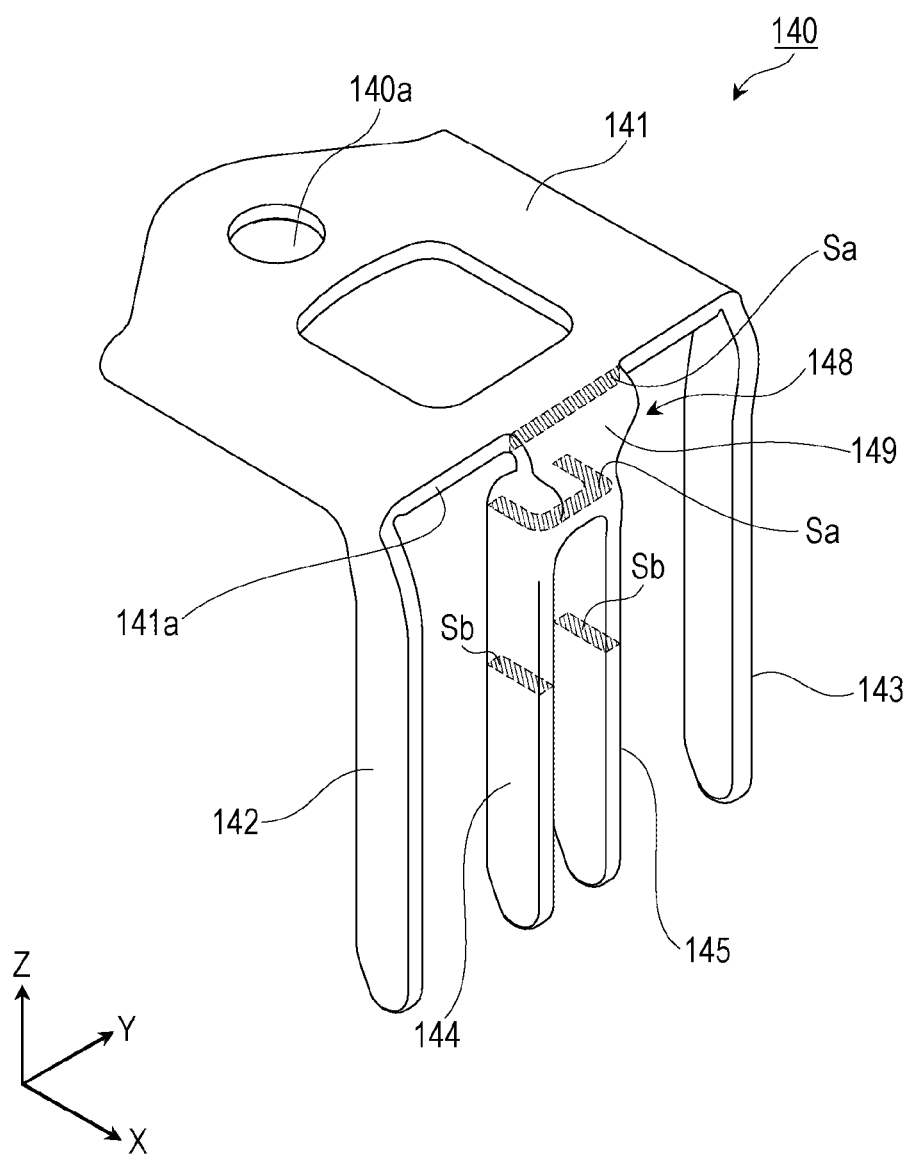
FIG. 4 is a first perspective view of the configuration of a positive electrode current collector.

FIG. 4 is a first perspective view of the configuration of the positive electrode current collector 140 according to the embodiment. Specifically, FIG. 4 is a perspective view seen from a diagonally upward front position, of the positive electrode current collector 140 shown in FIG. 3.

Figure 5:
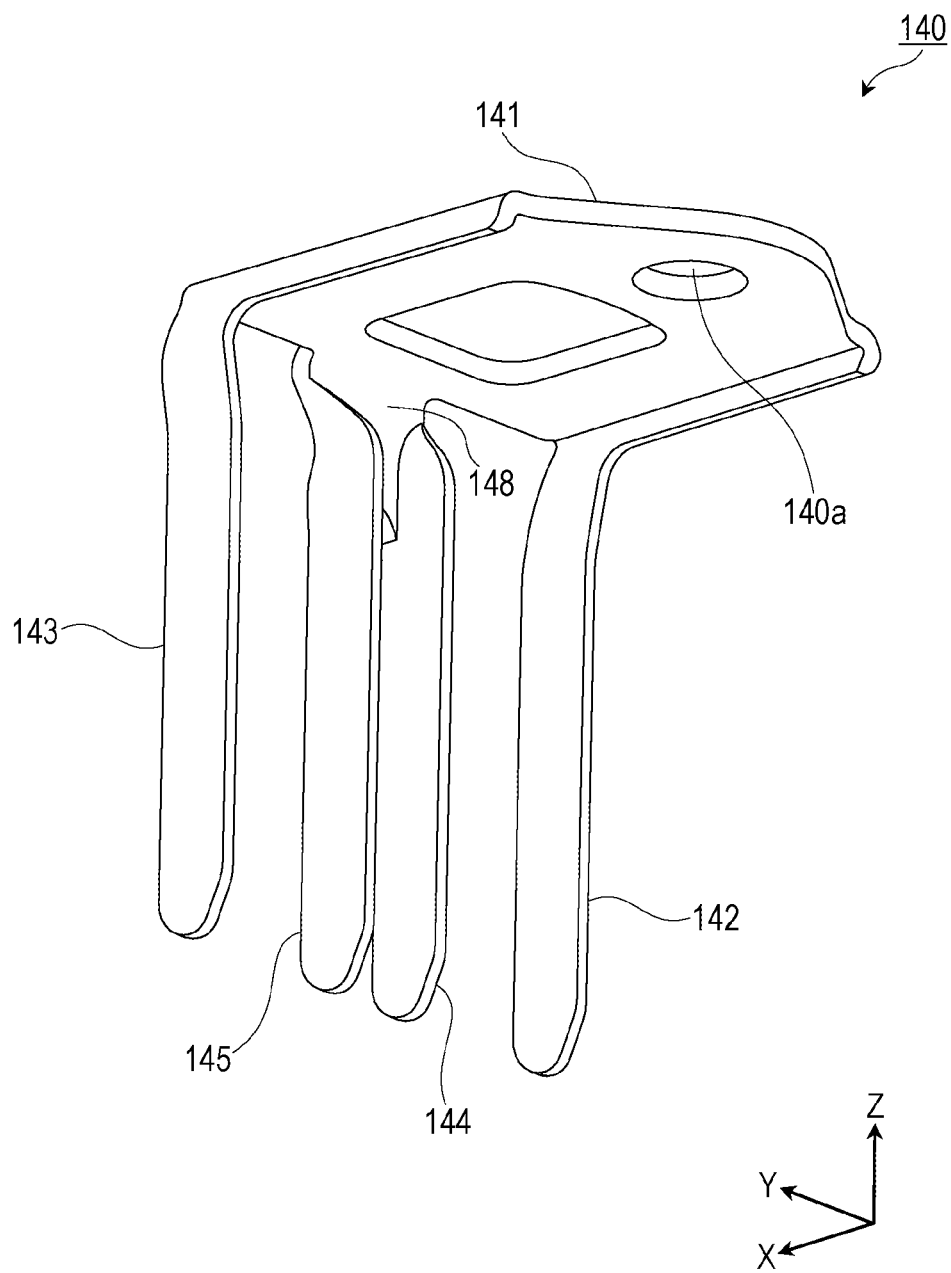
FIG. 5 is a second perspective view of the configuration of the positive electrode current collector.

FIG. 5 is a second perspective view of the configuration of the positive electrode current collector 140 according to the embodiment. Specifically, FIG. 5 is a perspective view seen from a diagonally downward rear position, of the positive electrode current collector 140 shown in FIG. 3.

Figure 6:
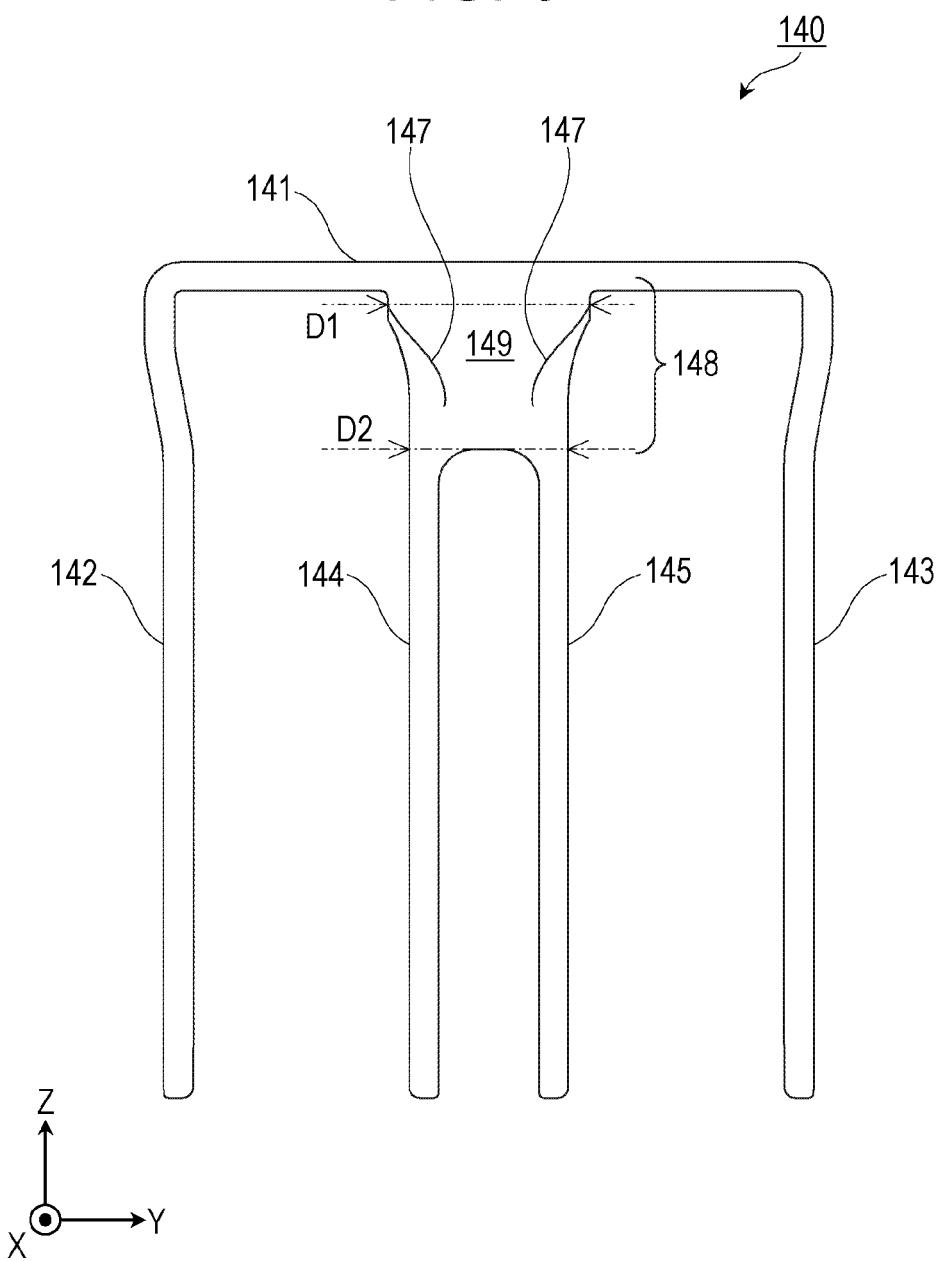
FIG. 6 is a side view seen laterally (from a positive side in an X axis direction), of the positive electrode current collector.

FIG. 6 is a side view seen laterally (from a positive side in the X axis direction), of the positive electrode current collector 140 according to the embodiment.

As shown in these figures, the positive electrode current collector 140 includes a terminal connection portion 141, a plurality of legs (four legs, namely, outer legs 142 and 143 and inner legs 144 and 145 according to the present embodiment), and a coupling portion 148. Each of these legs exemplifies the electrode body connection portion connected to at least one electrode body. The inner legs 144 and 145 particularly exemplify two electrode body connection portions coupled to the terminal connection portion 141 by way of the coupling portion 148.

Specifically, the positive electrode current collector 140 integrally including the terminal connection portion 141, the plurality of legs (142 to 145), and the coupling portion 148 is manufactured by processing, such as bending, drawing, ironing, twisting, and the like, a plate member made of aluminum alloy or the like and having a predetermined shape.

The terminal connection portion 141 is electrically connected to the positive electrode terminal 200, and is provided as a flat plate member in a substantially rectangular shape in the present embodiment. The terminal connection portion 141 is provided with the opening 140a. The connection portion 210 of the positive electrode terminal 200 is inserted to the opening 140a and is caulked. The positive electrode terminal 200 and the terminal connection portion 141 are thus electrically and mechanically connected to each other.

The opening 140a is a circular through hole provided in the terminal connection portion 141, and specifically has a shape corresponding to the outline of the connection portion 210. The opening 140a is not limited to the circular shape. The opening 140a can have an elliptic shape, a quadrilateral shape, or the like, but preferably has a shape corresponding to the outline of the connection portion 210. The opening 140a is not necessarily a through hole as long as has a shape allowing the connection portion 210 to be inserted thereto. The opening 140a can be provided as a cut-away portion formed by cutting away a semicircular shape or a rectangular shape.

As shown in FIG. 4 and the like, the positive electrode current collector 140 according to the present embodiment is provided with a substantially rectangular opening in addition to the opening 140a. This substantially rectangular opening can be provided to accommodate a projection provided on the rear surface (facing the positive electrode current collector 140) of the lower insulating member 120, but is not an essential element of the positive electrode current collector 140.

The plurality of legs (the outer legs 142 and 143 and the inner legs 144 and 145) are long members extending along the Z axis. Among the plurality of legs, the two legs (the inner legs 144 and 145) are aligned along the Y axis and are coupled to the terminal connection portion 141 by way of the coupling portion 148. The inner legs 144 and 145 extend from the coupling portion 148 oppositely with respect to the terminal connection portion 141. In other words, the inner legs 144 and 145 project from the coupling portion 148 oppositely with respect to the terminal connection portion 141.

The coupling portion 148 extends from an end of the terminal connection portion 141. Specifically, the coupling portion 148 extends from the end on the positive side in the X axis direction of the terminal connection portion 141 toward the negative side in the Z axis direction.

The other electrode body connection portions (the outer legs 142 and 143) extend from the terminal connection portion 141 and are aligned in the Y axis direction with the inner legs 144 and 145 connected to the coupling portion 148. The positive electrode current collector 140 can be alternatively provided with only one of the outer legs 142 and 143 as the other electrode body connection portion.

The positive electrode ends of the first and second electrode bodies 161 and 162 have side surfaces along the X axis as shown in FIG. 3 and the like. In other words, each of the four legs in the long flat plate shape preferably has a posture with a joint surface along the X axis (a posture having its thickness direction perpendicular to the X axis), for example, in order for better joint accuracy with the first electrode body 161 or the second electrode body 162.

The outer legs 142 and 143 according to the present embodiment each extend from a side along the X axis, of the terminal connection portion 141 in the plate shape. That is, the outer legs 142 and 143 are each formed by bending the long portion extending from the terminal connection portion 141 at substantially 90 degrees along the side in the X axis direction. Each of the outer legs 142 and 143 thus has a posture with the joint surface along the X axis.

In contrast, the inner legs 144 and 145 are provided continuously from the coupling portion 148 that extends from a side 141a along the Y axis, of the terminal connection portion 141.

Specifically, the joint surfaces of the inner legs 144 and 145 are provided along the Y axis only through the step of bending at substantially 90 degrees along the side 141a extending in the Y axis direction, the coupling portion 148 at the connection end with the terminal connection portion 141 (the first bending step).

It is thus necessary to perform, before or after the first bending step or simultaneously therewith, the step of bending at substantially 90 degrees and drawing the inner legs 144 and 145 with respect to the coupling portion 148 (the second bending step), so as to direct the joint surfaces of the inner legs 144 and 145 along the X axis.

Alternatively, the inner leg 144 can be twisted at an intermediate position in the longitudinal direction so as to direct the joint surface of the inner leg 144 along the X axis. However, the inner leg 144 is reduced in length at the portion to be joined to the first electrode body 161, and the first electrode body 161 and the terminal connection portion 141 form a larger useless space therebetween. The same applies to the inner leg 145 to be joined to the second electrode body 162.

In view of the above, the inner legs 144 and 145 are preferably bent at positions relatively close to the terminal connection portion 141 so as to direct the joint surfaces of the inner legs 144 and 145 along the X axis.

Figure 7:
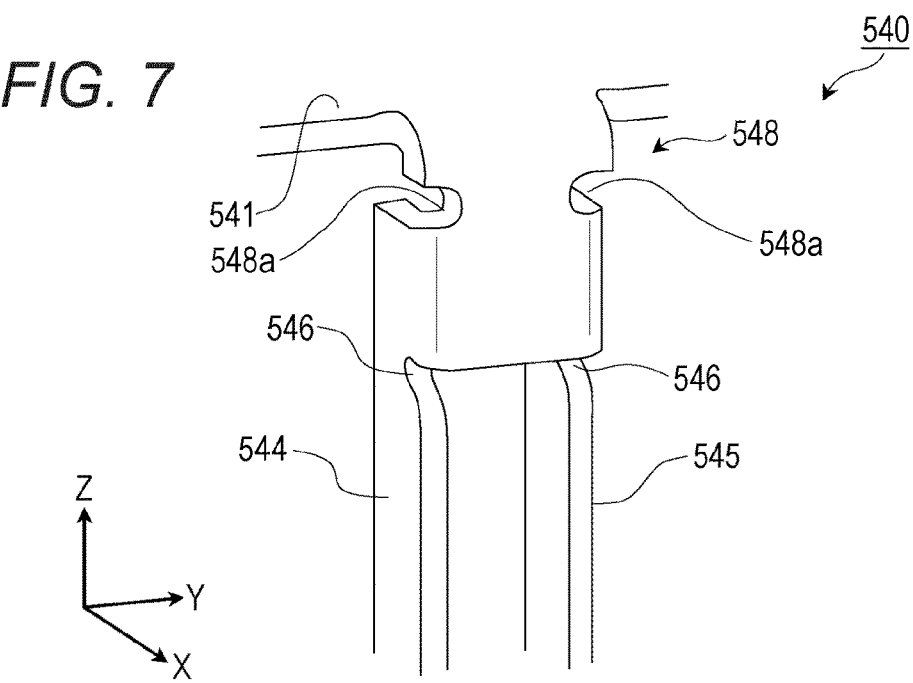
FIG. 7 is a partial enlarged view of a positive electrode current collector according to a comparative example.

Accordingly exemplified is a structure like a positive electrode current collector 540 shown in FIG. 7.

FIG. 7 is a partial enlarged view of the positive electrode current collector 540 according to a comparative example.

The positive electrode current collector 540 shown in FIG. 7 includes a terminal connection portion 541, inner legs 544 and 545 extending along the Z axis, and a coupling portion 548 coupling the terminal connection portion 541 and the inner legs 544 and 545.

In the positive electrode current collector 540 shown in FIG. 7, the both ends in the Y axis direction of the coupling portion 548 are connected with the legs (the inner legs 544 and 545). The both ends in the Y axis direction of the coupling portion 548 are bent at substantially 90 degrees along bending lines provided along the Z axis. The inner legs 544 and 545 thus have the joint surfaces along the X axis.

In this case, however, as shown in FIG. 7, in order to prevent damage such as a crack caused by bending at substantially 90 degrees, the coupling portion 548 is provided, at sides along the Z axis at the both ends in the Y axis direction, with cut-away portions 548a in semicylindrical shapes for relief of stress concentration. The cut-away portions 548a each have a shape recessed in the Y axis direction from the side.

The coupling portion 548 accordingly has a portion of a smaller sectional area than those at front and rear positions in its extending direction (from the terminal connection portion 541 toward the inner legs 544 and 545). This configuration causes problems such as increase in electric resistance and deterioration in strength.

As shown in FIGS. 4 to 6, in the positive electrode current collector 140 according to the present embodiment, the both ends in the Y axis direction of the coupling portion 148 are gradually bent from positions close to the connection end of the coupling portion 148 with the terminal connection portion 141. Specifically, the both ends in the Y axis direction of the coupling portion 148 are bent and drawn such that portions along the X axis become gradually longer toward the inner legs 144 and 145 (toward the lower end in FIGS. 4 to 6).

The second bending step will be described as follows. The both ends in the Y axis direction of the coupling portion 148 are bent and drawn toward the first and second electrode bodies 161 and 162 (e.g. pressed with use of a mold) such that the width along the Y axis of an outer side surface 149 of the coupling portion 148 is gradually reduced toward the inner legs 144 and 145.

Accordingly, as shown in FIG. 6 and the like, the coupling portion 148 can be provided, on the outer side surface 149 opposite to the side surface facing the first and second electrode bodies 161 and 162, with a pair of bending lines 147 generally reduced in gap therebetween gradually toward the lower end.

As shown in FIG. 6, the coupling portion 148 has the outer side surface 149 in a substantially trapezoidal shape, with a width D1 along the Y axis at the connection end with the end of the terminal connection portion 141 being larger than a width D2 along the Y axis at the connection end with the inner legs 144 and 145. Such a substantially trapezoidal shape includes a perfect trapezoidal shape.

The bending lines 147 are shown with clear solid lines in FIG. 6 for convenience of the description, although the bending lines 147 need not be recognized as clear lines in their outer appearance.

The coupling portion 148 according to the present embodiment has the outer side surface 149 formed into a substantially trapezoidal shape as described above. Specifically, the outer side surface 149 has a substantially trapezoidal shape with the larger width (D1) at the connection end with the end of the terminal connection portion 141 and the shorter width (D2) at the connection end with the inner legs 144 and 145.

In summary, the inner legs 144 and 145 having the joint surfaces along the X axis are formed naturally with no provision of cut-away portions for prevention of a crack or the like (relief of stress concentration), at the ends of the bending lines 147 between the coupling portion 148 and the inner legs 144 and 145. The coupling portion 148 thus has no portion of a smaller sectional area due to provision of cut-away portions. This configuration achieves the positive electrode current collector 140 of high reliability.

More specifically, as shown in FIG. 4 and the like, the coupling portion 148 in the positive electrode current collector 140 according to the present embodiment has a sectional area Sa not less than the total sectional areas (2Sb) of the inner legs 144 and 145 at any position on the coupling portion 148.

In other words, there is no portion of a smaller sectional area than the total sectional areas (2Sb) of the inner legs 144 and 145 between the terminal connection portion 141 and the inner legs 144 and 145.

The coupling portion 148 thus has no point of high resistance between the terminal connection portion 141 and the inner legs 144 and 145. The positive electrode current collector 140 is further improved in reliability in a case where a large amount of current flows between the terminal connection portion 141 and the inner legs 144 and 145.

The sectional area Sa of the coupling portion 148 is an area of the cross section along the Y axis (along the width) as well as perpendicular to the outer side surface 149. The sectional area Sb of each of the inner legs 144 and 145 is an area of the cross section perpendicular to the Z axis (the cross section along the width).

The inner legs 144 and 145 according to the present embodiment are each assumed to have the sectional area Sb. Alternatively, the sectional area of the inner leg 144 can be different from the sectional area of the inner leg 145.

Assume a case where the inner leg 144 has a sectional area Sb1 and the inner leg 145 has a sectional area Sb2 (≠Sb1). In this case, the coupling portion 148 in the positive electrode current collector 140 has the sectional area Sa not less than the total sectional areas (Sb1+Sb2) of the inner legs 144 and 145 at any position on the coupling portion 148.

As shown in FIGS. 4 to 6, the coupling portion 148 extends from part of the side 141a at the end of the terminal connection portion 141. Specifically, the coupling portion 148 extends from part of the side 141a along the Y axis (along the width) of the terminal connection portion 141 in the plate shape, at the end of the terminal connection portion 141.

The coupling portion 148 is provided such that, at the terminal connection portion 141 having a relatively large width along the Y axis, the positions in the Y axis direction of the inner legs 144 and 145 are suited to connection with the first and second electrode bodies 161 and 162.

In the present embodiment, the width D1 (see FIG. 6) along the Y axis at the connection end of the outer side surface 149 of the coupling portion 148 with the end of the terminal connection portion 141 is smaller than the width of the side 141a at the end of the terminal connection portion 141. The coupling portion 148 is provided at the center in the width direction of the side 141a at the end of the terminal connection portion 141.

As described above, the positive electrode current collector 140 according to the present embodiment can reduce electric resistance at the terminal connection portion 141 and include the coupling portion 148 and the inner legs 144 and 145 at the positions suited to connection with the at least one electrode body.

The positive electrode current collector 140 according to the present embodiment also has the other legs (the outer legs 142 and 143) extending along the Z axis from the terminal connection portion 141 and aligned along the Y axis with the inner legs 144 and 145.

The positive electrode current collector 140 can thus be disposed such that each of the electrode bodies (the first and second electrode bodies 161 and 162) is interposed between two legs.

As shown in FIG. 7, the positive electrode current collector 540 according to the comparative example is provided with cut-away portions 546 also at the roots of the inner legs 544 and 545. The inner legs 544 and 545 are provided at the roots with the cut-away portions 546 in order to prevent generation of a crack and the like at the roots of the inner legs 544 and 545 during bending for formation of the inner legs 544 and 545.

In contrast, as shown in FIGS. 4 to 6, the inner legs 144 and 145 in the positive electrode current collector 140 according to the present embodiment are not provided at the roots with any cut-away portions.

Specifically, as apparent from FIG. 6 and the like, these roots (the connection end between the inner legs 144 and 145 and the coupling portion 148) each have an outline of a gentle curved line in a side view. This configuration relieves stress concentration at the roots. Accordingly, the positive electrode current collector 140 according to the present embodiment does not require the cut-away portions 546 as in the positive electrode current collector 540 according to the comparative example.

Each of the inner legs 144 and 145 has no cut-away portion and thus has no portion of a sectional area reduced by such a cut-away portion. The inner legs 144 and 145 cause no problems such as increase in electric resistance and deterioration in strength.

The energy storage device 10 according to the present embodiment includes the two electrode bodies (the first and second electrode bodies 161 and 162), the inner leg 144 connected to the first electrode body 161, and the inner leg 145 connected to the second electrode body 162. The two electrode bodies (the first and second electrode bodies 161 and 162) and the positive electrode terminal 200 are electrically connected by the single member (the positive electrode current collector 140) in this configuration.

The coupling portion 148 coupling the terminal connection portion 141 and the inner legs 144 and 145 is positioned between the first and second electrode bodies 161 and 162 in an alignment direction of the first and second electrode bodies 161 and 162 (along the Y axis).

This configuration equalizes the conditions for electric resistance and the like between the first and second electrode bodies 161 and 162 with respect to the positive electrode terminal 200. Furthermore, the first and second electrode bodies 161 and 162 are supported by the positive electrode current collector 140 with good balance.

Described above is the energy storage device according to the embodiment of the present invention. However, the present invention is not limited to the above embodiment. Unless departing from the purpose of the present invention, any mode obtained by applying various modifications devised by those skilled in the art to the above embodiment as well as any mode obtained by combining the plurality of constituent elements described above are included in the scope of the present invention.

For example, the positive electrode current collector 140 can be processed to reinforce the coupling portion 148 connected with the two legs (the inner legs 144 and 145).

Figure 8:
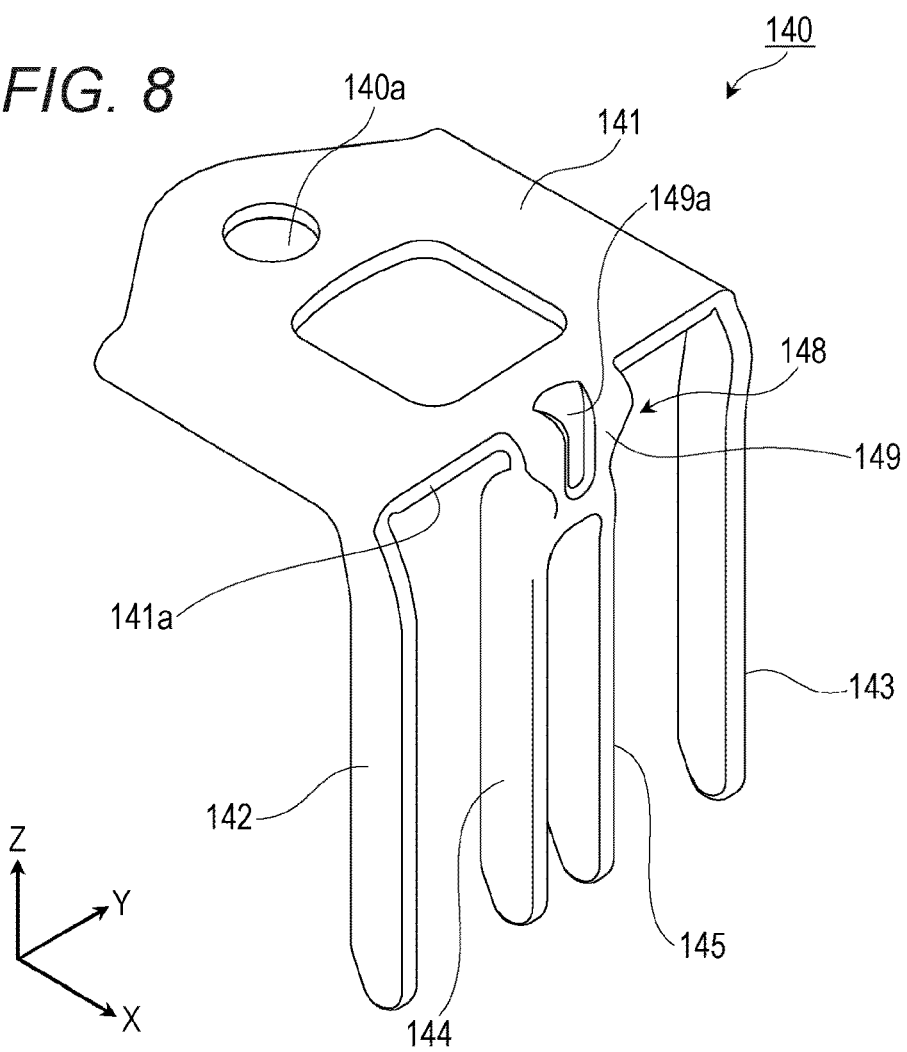
FIG. 8 is a perspective view of outer appearance of the positive electrode current collector including a bead portion.

FIG. 8 is a perspective view of outer appearance of the positive electrode current collector 140 including a bead portion.

The coupling portion 148 in the positive electrode current collector 140 has a bead portion 149a as shown in FIG. 8. The bead portion 149a is a reinforcing portion provided to the coupling portion 148 in order for increase in strength of the coupling portion 148.

The bead portion 149a projects in the thickness direction of the coupling portion 148. Specifically, the bead portion 149a extends in the up-down direction (along the Z axis) at the center of the coupling portion 148, and projects inward (toward the negative side in the X axis direction) from the positive electrode current collector 140. The bead portion 149a is provided by a portion recessed from the outer side surface 149 and projecting from the inner surface (on the negative side in the X axis direction) of the coupling portion 148.

Alternatively, the bead portion 149a can be provided by a portion recessed from the inner surface (on the negative side in the X axis direction) of the coupling portion 148 and projecting from the outer side surface 149. Still alternatively, the bead portion 149a can project from a first surface and have a flat second surface.

As described above, the positive electrode current collector 140 can be improved in strength by provision of the bead portion 149a to the coupling portion 148. This configuration improves vibration resistance or impact resistance of the energy storage device 10 including the positive electrode current collector 140.

According to FIG. 6, the pair of bending lines 147 provided to the coupling portion 148 according to the present embodiment is curved inward. The pair of bending lines 147 can alternatively have curved outward. Still alternatively, the pair of bending lines 147 can be straight.

In summary, the pair of bending lines 147 has only to be generally reduced in gap therebetween gradually toward the lower ends. The pair of bending lines 147 can be provided, partially in the up-down direction, with sections having a wider gap than the gap immediately thereabove.

The positive electrode current collector 140 according to the present embodiment is provided with the four legs (142 to 145). Alternatively, the positive electrode current collector 140 according to the present embodiment has only to be provided with at least two legs.

Specifically, the positive electrode current collector 140 has two electrode body connection portions (the inner legs 144 and 145 according to the present embodiment) coupled with the terminal connection portion 141 by way of the coupling portion 148, and may not have other electrode body connection portions.

Even in such a case where the positive electrode current collector 140 is not provided with any other legs, the two legs connected to the coupling portion 148 can be formed by bending naturally with no provision of cut-away portions.

In the case where the positive electrode current collector 140 includes only the inner legs 144 and 145 as the electrode body connection portions, the positive electrode current collector 140 can be disposed such that the inner legs 144 and 145 interpose the positive electrode end of a single electrode body.

In this case, the energy storage device 10 does not necessarily include a plurality of electrode bodies, but has only to have at least one electrode body. In other words, the number of electrode bodies included in the energy storage device 10 can be "one".

The coupling portion 148 in the positive electrode current collector 140 according to the above embodiment is disposed between the two electrode bodies (161 and 162) adjacent to each other in the Y axis direction. The coupling portion 148 can be alternatively disposed beside any one of the electrode bodies. The coupling portion 148 can be disposed at any position on the side 141a along the Y axis, of the terminal connection portion 141.

The positive electrode current collector 140 and the positive electrode terminal 200 are connected to each other by caulking the connection portion 210 in the above embodiment. The method of connecting the positive electrode current collector 140 and the positive electrode terminal 200 is not limited to caulking but can be any other appropriate one.

The negative electrode current collector 150 is configured similarly to the positive electrode current collector 140 in the above embodiment. Alternatively, only the positive electrode current collector 140 can be configured as described above. Still alternatively, only the negative electrode current collector 150 can be configured as described above.

Modification Example

The positive electrode current collector 140 according to the above embodiment is not provided with cut-away portions for prevention of a crack (relief of stress concentration) during processing such as bending. This configuration does not cause problems such as increase in electric resistance due to provision of the cut-away portions.

Alternatively, the positive electrode current collector 140 can be provided with cut-away portions so as not to cause problems such as increase in electric resistance, for prevention of a crack (relief of stress concentration) during processing such as bending. Described with reference to FIGS. 9 to 17 is a current collector according to a modification example of the embodiment, which has the characteristics in common with the positive electrode current collector 140 according to the above embodiment and is provided with cut-away portions (cut-off portions) for prevention of a crack (relief of stress concentration).

A positive electrode current collector 240 to be described below is a member replaceable with the positive electrode current collector 140 in the energy storage device 10 (see FIG. 2 and the like) according to the embodiment. The positive side in the X axis direction is assumed to be the front side in the following description.

Figure 9:
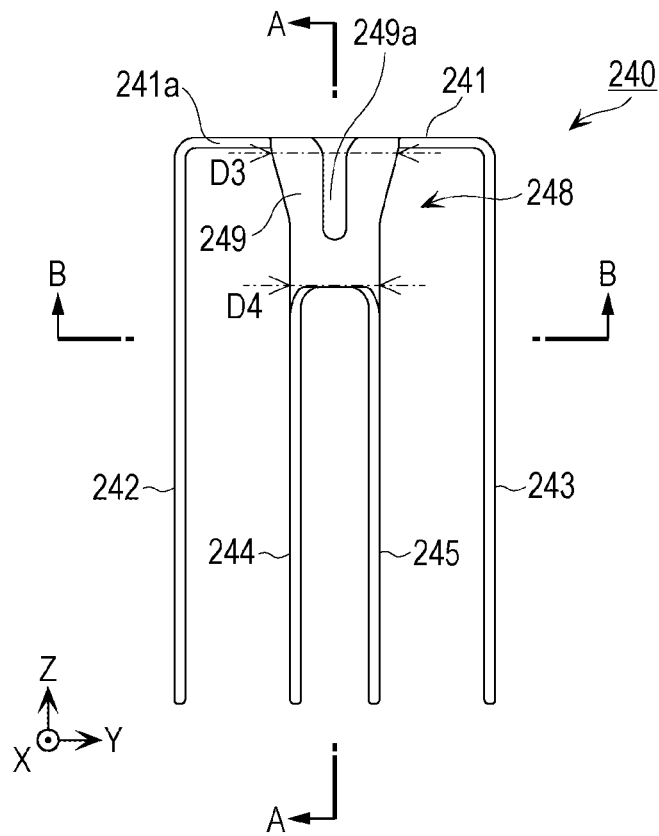
FIG. 9 is a front view of a positive electrode current collector according to a modification example.
Figure 10:
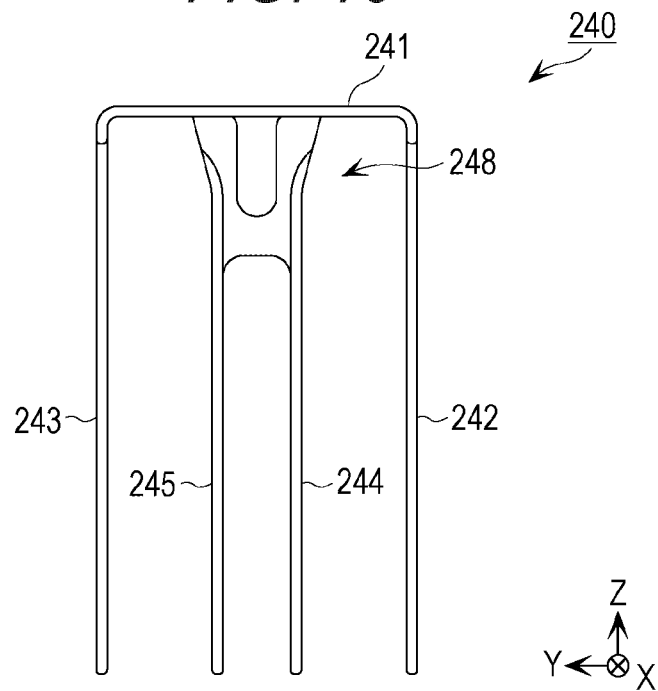
FIG. 10 is a rear view of the positive electrode current collector according to the modification example.
Figure 11:
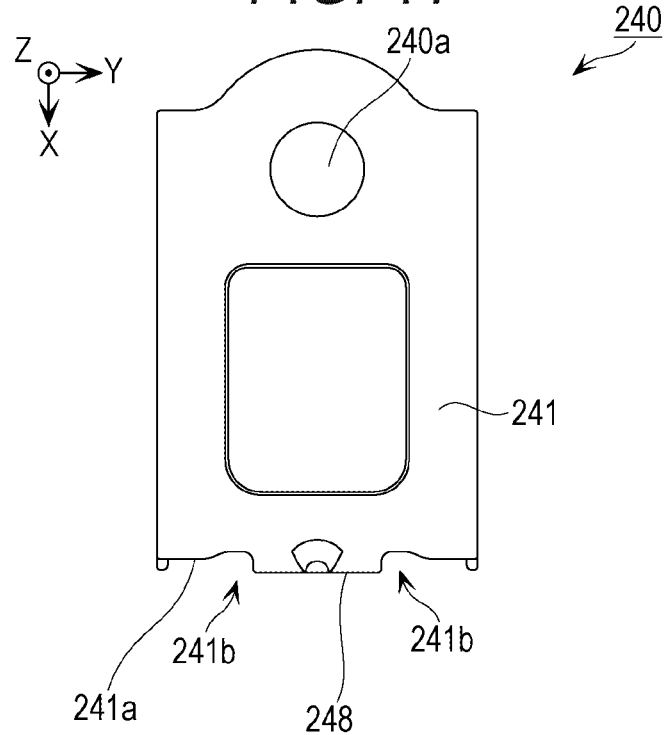
FIG. 11 is a plan view of the positive electrode current collector according to the modification example.
Figure 12:
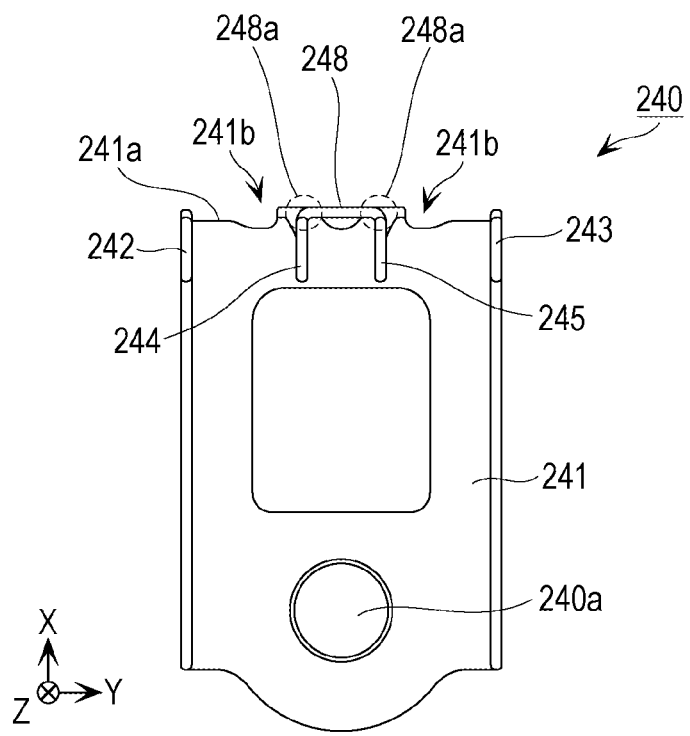
FIG. 12 is a bottom view of the positive electrode current collector according to the modification example.
Figure 13:
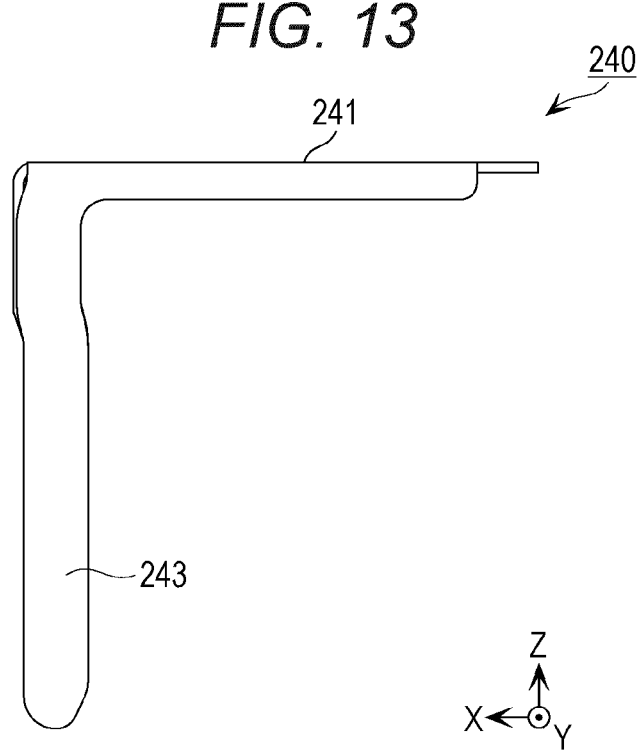
FIG. 13 is a first side view of the positive electrode current collector according to the modification example.
Figure 14:
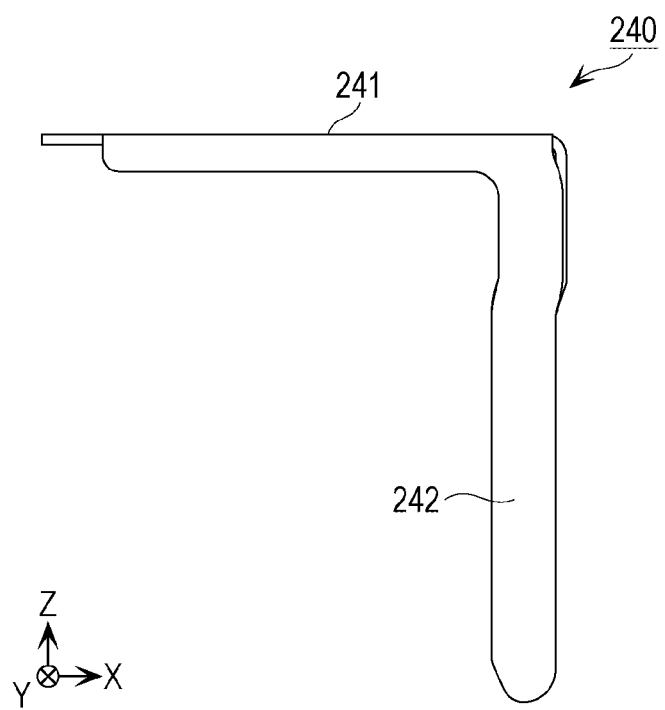
FIG. 14 is a second side view of the positive electrode current collector according to the modification example.

FIG. 9 is a front view of the positive electrode current collector 240 according to the modification example. FIG. 10 is a rear view of the positive electrode current collector 240 according to the modification example. FIG. 11 is a plan view of the positive electrode current collector 240 according to the modification example. FIG. 12 is a bottom view of the positive electrode current collector 240 according to the modification example. FIG. 13 is a first side view of the positive electrode current collector 240 according to the modification example. FIG. 14 is a second side view of the positive electrode current collector 240 according to the modification example. FIG. 13 shows the positive electrode current collector 240 seen from the positive side in the Y axis direction, whereas FIG. 14 shows the positive electrode current collector 240 seen from the negative side in the Y axis direction.

Figure 15:
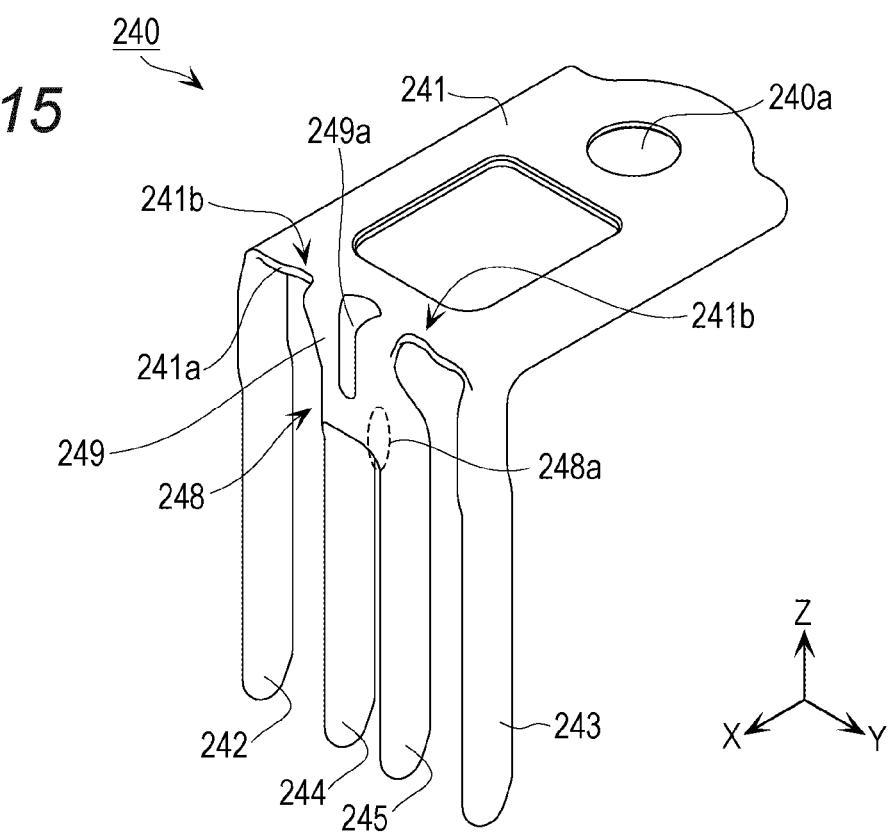
FIG. 15 is a first perspective view of the positive electrode current collector according to the modification example.
Figure 16:
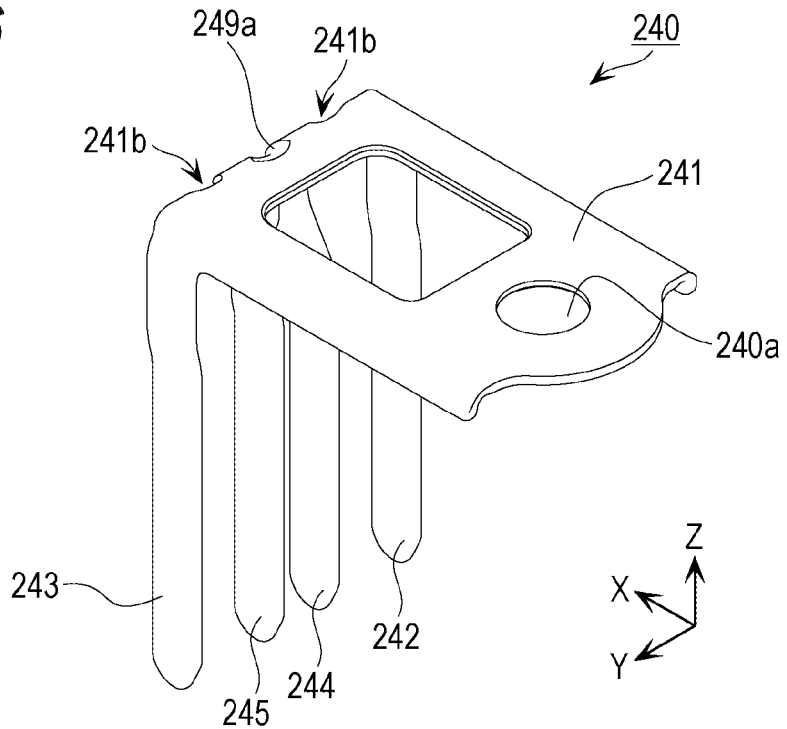
FIG. 16 is a second perspective view of the positive electrode current collector according to the modification example.
Figure 17:
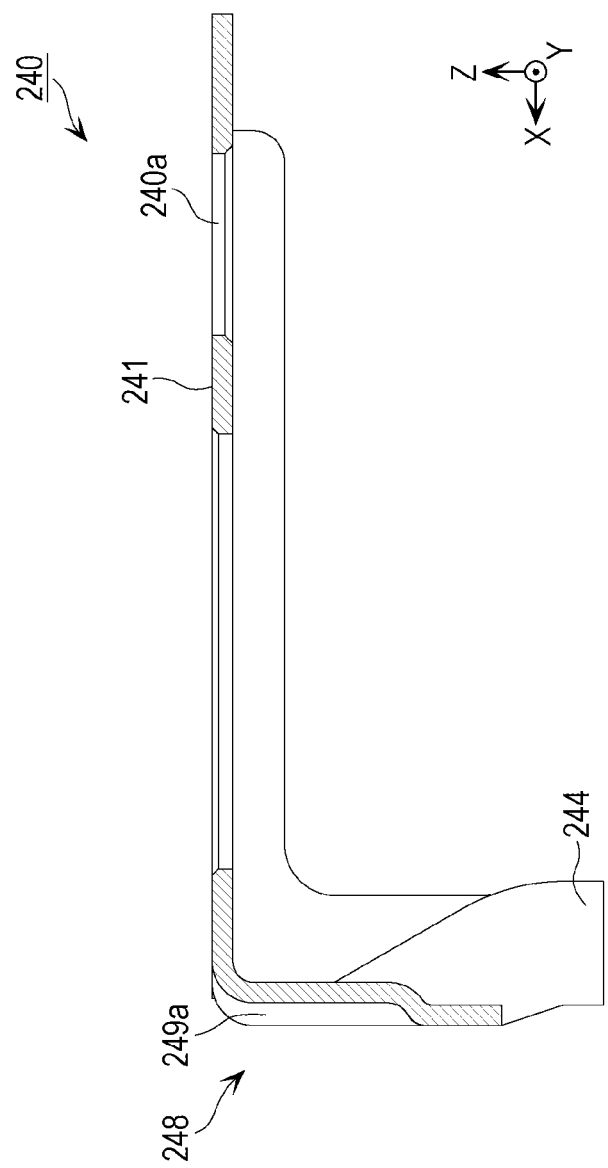
FIG. 17 is a partial sectional view of the positive electrode current collector according to the modification example.

FIG. 15 is a first perspective view of the positive electrode current collector 240 according to the modification example. FIG. 16 is a second perspective view of the positive electrode current collector 240 according to the modification example. FIG. 17 is a partial sectional view of the positive electrode current collector 240 according to the modification example. FIG. 17 shows an enlarged sectional view taken along line A-A at a portion B-B indicated in FIG. 9.

As shown in FIGS. 9 to 17, the positive electrode current collector 240 according to the present modification example includes a terminal connection portion 241, a plurality of legs (four legs, namely, outer legs 242 and 243 and inner legs 244 and 245 according to the present modification example), and a coupling portion 248.

The terminal connection portion 241 is electrically connected to the positive electrode terminal 200, and is provided with an opening 240a. The connection portion 210 of the positive electrode terminal 200 is inserted to the opening 240a and is caulked. The positive electrode terminal 200 and the terminal connection portion 241 are thus electrically and mechanically connected to each other.

The plurality of legs (the outer legs 242 and 243 and the inner legs 244 and 245) are members extending along the Z axis. Among the plurality of legs, the two legs (the inner legs 244 and 245) are aligned with each other in the Y axis direction and are coupled to the terminal connection portion 241 by way of the coupling portion 248. The inner legs 244 and 245 extend from the coupling portion 248 oppositely with respect to the terminal connection portion 241.

The other legs (the outer legs 242 and 243) extend from the terminal connection portion 241 and are aligned in the Y axis direction with the inner legs 244 and 245 connected to the coupling portion 248.

The coupling portion 248 extends from an end of the terminal connection portion 241. Specifically, the coupling portion 248 extends from a side 241a along the Y axis at the end of the positive side in the X axis direction of the terminal connection portion 241 toward the negative side in the Z axis direction.

As shown in FIG. 9 and the like, the coupling portion 248 has an outer side surface 249 in a substantially trapezoidal shape, with a width D3 along the Y axis at the connection end with the end of the terminal connection portion 241 being larger than a width D4 along the Y axis at the connection end with the inner legs 244 and 245. That is, similarly to the positive electrode current collector 140 according to the above embodiment, the inner legs 244 and 245 each have a natural posture suited to connection with the electrode body.

Specifically, the both ends in the Y axis direction of the coupling portion 248 are bent inward (to the negative side in the X axis direction) and drawn (e.g. pressed with use of a mold) such that the width along the Y axis of the outer side surface 249 of the coupling portion 248 is gradually reduced toward the inner legs 244 and 245. The coupling portion 248 accordingly has a substantially trapezoidal shape. Such bending and drawing processing differentiates the thickness directions between the coupling portion 248 and the inner legs 244 and 245. The coupling portion 248 has the thickness direction along the X axis whereas the inner legs 244 and 245 each have the thickness direction along the Y axis in the present modification example.

As shown in FIG. 12, the coupling portion 248 and the inner legs 244 and 245 different in thickness direction are connected by way of curved portions 248a. As apparent from the shape of the cross section (a shaded region having the sectional area Sa) of the coupling portion 148 shown in FIG. 4 and the like, the coupling portion 148 and the inner legs 144 and 145 different in thickness direction are connected by way of curved portions also in the positive electrode current collector 140 according to the above embodiment.

In this manner, the basic structure of the positive electrode current collector 240 according to the present modification example is in common with the positive electrode current collector 140 according to the above embodiment. Specifically, the positive electrode current collector 240 according to the present modification example includes the terminal connection portion 241 electrically connected to the positive electrode terminal 200, the two legs (the inner legs 244 and 245) connected to at least one electrode body, and the coupling portion 248 extending from the end of the terminal connection portion 241 and coupling the terminal connection portion 241 and the inner legs 244 and 245. The coupling portion 248 has a substantially trapezoidal shape with the width at the connection end with the end of the terminal connection portion 241 being larger than the width at the connection end with the inner legs 244 and 245.

The positive electrode current collector 240 according to the present modification example is provided, in addition to the above configuration, with cut-off portions 241*b* at positions beside the connection end with the coupling portion 248 on the side 241*a* at the end of the terminal connection portion 241.

Specifically, as shown in FIG. 11 and the like, the cut-off portions 241*b* are recessed from the side 241*a* at the end of the terminal connection portion 241 toward the connection end (i.e. the opening 240*a*) of the terminal connection portion 241 with the positive electrode terminal 200 in a planar view.

The terminal connection portion 241 is provided with the cut-off portions 241*b* such that there is no portion of a smaller sectional area than those at front and rear positions in the direction of lines connecting the inner legs 244 and 245 and the positive electrode terminal 200 (the X axis direction in the present modification example). More specifically, the terminal connection portion 241 is provided, on the both sides of the connection end with the coupling portion 248, with the cut-off portions 241*b*.

This configuration facilitates the step of bending at substantially 90 degrees along the side 241*a* extending in the Y axis direction, the coupling portion 248 at the connection end with the terminal connection portion 241 (the first bending step) for manufacture of the positive electrode current collector 240. The first bending step relieves stress concentration at the connection end thereby to reduce possibility of damage such as a crack. Furthermore, these effects such as facilitation of the first bending step and suppression of damage can be achieved without problems such as increase in electric resistance and deterioration in strength.

The cut-off portions 241*b* are not necessarily formed by actually cutting off the end of the terminal connection portion 241. For example, the cut-off portions 241*b* can be formed through pressing for formation of the entire shape of the terminal connection portion 241.

In the positive electrode current collector 240 according to the present modification example, similarly to the positive electrode current collector 140 shown in FIG. 8, the coupling portion 248 is provided with a convex portion 249*a* for improvement in strength of the coupling portion 248. This configuration improves vibration resistance and impact resistance of the energy storage device 10 including the positive electrode current collector 240.

The current collector connected to the negative electrode of at least one of the first and second electrode bodies 161 and 162 can have the various characteristics of the positive electrode current collector 240 according to the present modification example.

The present invention is applicable to an energy storage device and the like, such as a lithium ion secondary battery.

What is claimed is:

1. An energy storage device comprising:
an electrode terminal;
first and second electrode bodies, each of the first and second electrode bodies comprising a positive electrode, a negative electrode, and a separator; and
a current collector electrically connecting the electrode terminal and the first and second electrode bodies,
wherein the current collector includes
a terminal connection portion electrically connected to the electrode terminal,
two electrode body connection portions connected to the first and second electrode bodies, respectively, and
a coupling portion extending from an end of the terminal connection portion and coupling the terminal connection portion and the two electrode body connection portions,
wherein when viewed parallel to a direction in which the coupling portion extends from the end of the terminal connection portion, the coupling portion is located between
the first and second electrode bodies, wherein the coupling portion includes side walls intersecting with a front wall, and wherein, at any position in an extending direction of the coupling portion, the coupling portion has an area of a cross section along an entire length of a width of the coupling portion, including the width of the front wall and the side walls, being not less than total areas of cross sections along a width of the two electrode body connection portions.

2. The energy storage device according to claim 1, wherein the coupling portion has a substantially trapezoidal shape with one pair of parallel first and second sides, the first side is at the end of the terminal connection portion, the second side is at a lowermost end of the coupling portion, a length of the first side is larger than a length of the second side.

3. An energy storage device comprising:
an electrode terminal;
first and second electrode bodies, each of the first and second electrode bodies comprising a positive electrode, a negative electrode, and a separator wound around a winding axis; and
a current collector electrically connecting the electrode terminal and the first and second electrode bodies,
wherein the current collector includes
a terminal connection portion electrically connected to the electrode terminal,
two outer legs extending from a side of the terminal connection portion, the side of the terminal connection portion being parallel to the winding axis,
a coupling portion extending from an end of the terminal connection portion, the end of the terminal connection portion being perpendicular to the winding axis and,
two inner legs extending from the coupling portion between the two outer legs,
wherein the coupling portion includes side walls intersecting with a front wall, and wherein, at any position in an extending direction of the coupling portion, the coupling portion has an area of a cross section along an entire length of a width of the coupling portion, including the width of the front wall and the side walls, being not less than total areas of cross sections along a width of the two electrode body connection portions.

4. The energy storage device according to claim 3, wherein the coupling portion has a substantially trapezoidal shape with one pair of parallel first and second sides, the first side is at the end of the terminal connection portion, the second side is at a lowermost end of the coupling portion, a length of the first side is larger than a length of the second side.

5. The energy storage device according to claim 3, wherein when viewed parallel to the winding axis, the coupling portion is located between the first electrode body and the second electrode body.

* * * * *